(12) United States Patent
Kerr et al.

(10) Patent No.: US 11,407,669 B2
(45) Date of Patent: Aug. 9, 2022

(54) ANGLED BLANK GLASS FEED APPARATUS, SYSTEM, AND METHOD

(71) Applicant: Owens-Brockway Glass Container Inc., Perrysburg, OH (US)

(72) Inventors: Karen Kerr, Cygnet, OH (US); Robin L. Flynn, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 223 days.

(21) Appl. No.: 16/555,713

(22) Filed: Aug. 29, 2019

(65) Prior Publication Data

US 2021/0061695 A1 Mar. 4, 2021

(51) Int. Cl.
*C03B 7/20* (2006.01)
*C03B 9/13* (2006.01)

(52) U.S. Cl.
CPC . *C03B 7/20* (2013.01); *C03B 9/13* (2013.01)

(58) Field of Classification Search
CPC .... C03B 7/20; C03B 9/13; C03B 9/18; C03B 9/195
See application file for complete search history.

(56) References Cited

U.S. PATENT DOCUMENTS

| | | |
|---|---|---|
| 1,264,328 A | 4/1918 | Peiler |
| 1,840,532 A | 1/1932 | Rowe |
| 2,388,876 A | 11/1945 | Smith |
| 3,622,305 A | 11/1971 | Becker |
| 4,002,453 A | 1/1977 | Becker |
| 4,162,909 A * | 7/1979 | Peters ............... C03B 7/14 65/163 |
| 4,339,234 A | 7/1982 | Dahms |
| 4,599,101 A | 7/1986 | Douglas et al. |
| 4,793,847 A | 12/1988 | Kawachi et al. |
| 5,135,559 A | 8/1992 | Sasso et al. |
| 5,405,424 A | 4/1995 | Steffan et al. |
| 2011/0197635 A1 | 8/2011 | McDermott et al. |
| 2016/0107915 A1* | 4/2016 | Schiavo ............... C03B 9/40 65/222 |

FOREIGN PATENT DOCUMENTS

| | | |
|---|---|---|
| GB | 454289 | 9/1936 |
| JP | 01270522 | 10/1989 |

OTHER PUBLICATIONS

Int. Search Report and Written Opinion, Int. Application Serial No. PCT/US2020/048369, Int. Filing Date: Aug. 28, 2020, Applicant: Owens-Brockway Glass Container Inc., dated Nov. 9, 2020.

* cited by examiner

*Primary Examiner* — Cynthia Szewczyk

(57) ABSTRACT

A glass blank feeding apparatus, system, and method for feeding a glass gob to an angled blank mold are disclosed. The glass blank feeding apparatus includes at least one scoop configured to receive a glass gob along a vertical axis from a gob feeder and a blank mold aligned along a longitudinal axis at a non-zero angle from the vertical axis, where the blank mold is configured to receive the glass gob directly from the at least one scoop along the longitudinal axis.

5 Claims, 4 Drawing Sheets

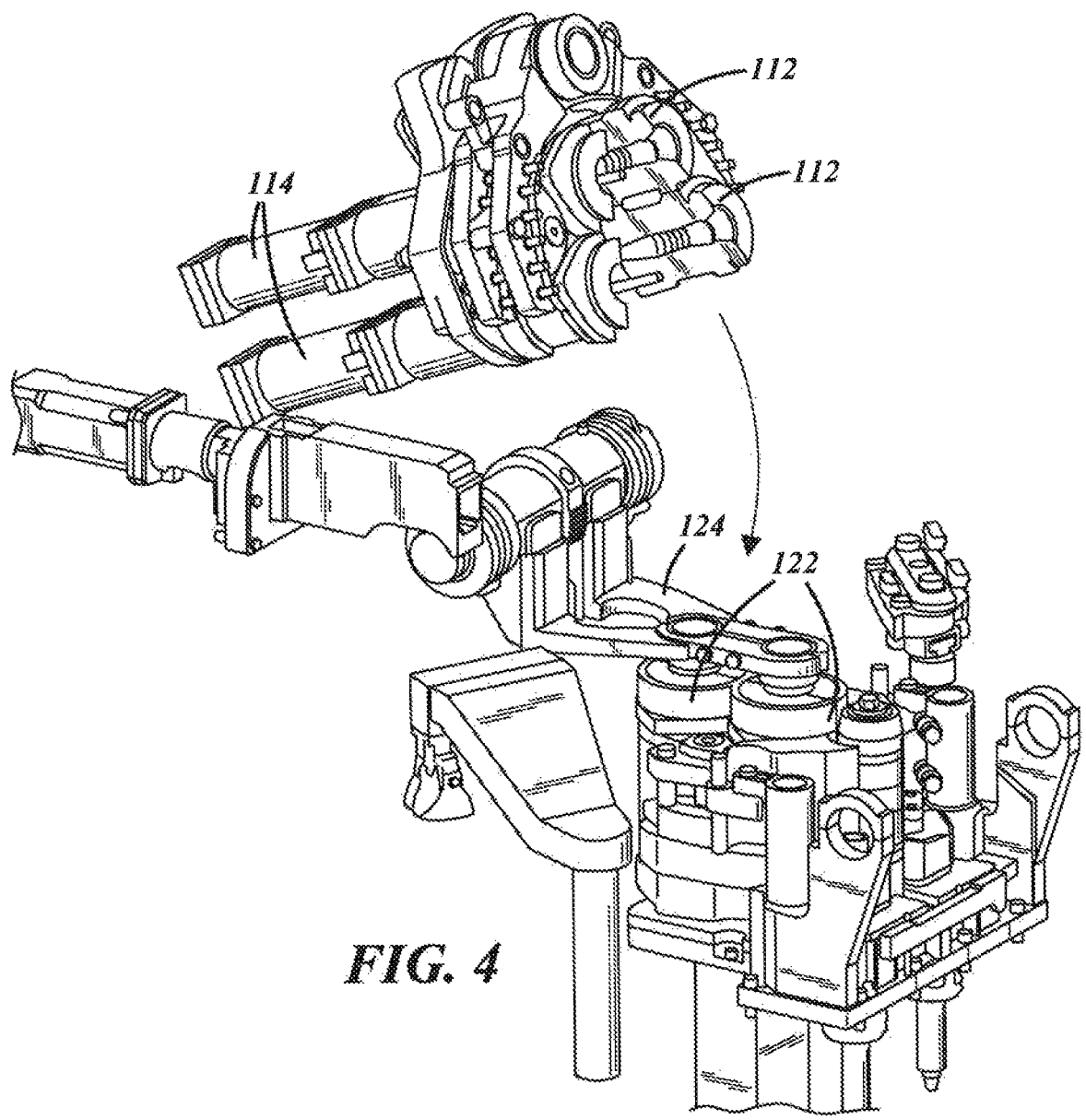
FIG. 4
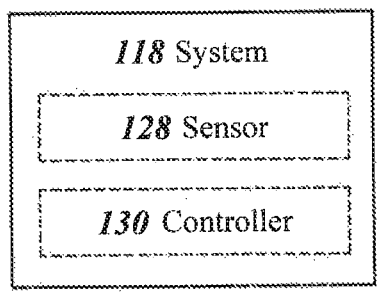
FIG. 5
| Dispense glass gob from gob distributor to scoop and blank mold | 402 |
| Form glass gob into parison using blank mold | 404 |
| Rotate parison to blow mold | 406 |
FIG. 6

ANGLED BLANK GLASS FEED APPARATUS, SYSTEM, AND METHOD

This patent application discloses systems and methods for glass container manufacturing, and more particularly, systems and methods for feeding a glass gob from a gob feeder to a blank mold.

BACKGROUND

During glass container manufacturing, molten glass can be fed into a blank mold, often in the form of a glass gob. A feeder can control the temperature and quantity of molten glass and the gobbing rate of the glass gobs. The glass gob can be subsequently formed into a container using forming processes, for example, using a blow-and-blow or a press-and-blow process.

BRIEF SUMMARY OF THE DISCLOSURE

The present disclosure embodies a number of aspects that can be implemented separately from or in combination with each other.

An angled glass blank feeding apparatus in accordance with one aspect of the disclosure includes at least one scoop configured to receive a glass gob along a vertical axis from a gob feeder; and a blank mold aligned along a longitudinal axis at a non-zero angle from the vertical axis, where the blank mold is configured to receive the glass gob directly from the at least one scoop along the longitudinal axis.

A system for distributing a glass gob into a blank mold directly from an exit end of a scoop in accordance with one aspect of the disclosure includes a gob feeder and an angled glass blank feeding apparatus including at least one scoop configured to receive a glass gob along a vertical axis from the gob feeder, and at least one blank mold aligned along a longitudinal axis at a non-zero angle from the vertical axis, where the at least one blank mold is configured to receive the glass gob directly from the at least one scoop along the longitudinal axis and is carried by an upper rotary table, and where the blank mold is configured to form the glass gob into a parison; and a lower rotary table including at least one blow mold configured to receive the parison from the blank mold.

A method for feeding a glass gob to an angled blank mold in accordance with one aspect of the disclosure includes dispensing a glass gob along a vertical axis from a gob feeder to a scoop, where the glass gob is directed, using the scoop, along a longitudinal axis to a blank mold carried by an upper table, where the longitudinal axis is at a non-zero angle from the vertical axis, and where the blank mold is aligned along the longitudinal axis; and forming the glass gob into a parison using the blank mold. In some instances, the method may include rotating the parison to a blow mold carried by a lower table.

BRIEF DESCRIPTION OF THE DRAWINGS

The disclosure, together with additional objects, features, advantages and aspects thereof, will be best understood from the following description, the appended claims and the accompanying drawings, in which:

FIG. 4 is an isometric view illustrating the angled glass blank feeding apparatus and a neckring arm shown in FIGS. 1 through 3, where the neckring arm is rotating parisons from the angled blank molds to blow molds, in accordance with an illustrative embodiment of the present disclosure.

FIG. 5 is a diagrammatic view showing various elements of the system in FIGS. 1 and 2 for distributing a glass gob into a blank mold directly from an exit end of a scoop, in accordance with an illustrative embodiment of the present disclosure.

FIG. 6 is a flow diagram showing various steps of an illustrative embodiment of a method for distributing a glass gob into a blank mold directly from an exit end of a scoop using the angled glass blank feeding apparatus and system shown in FIGS. 1 through 5.

DETAILED DESCRIPTION

Figure 1:
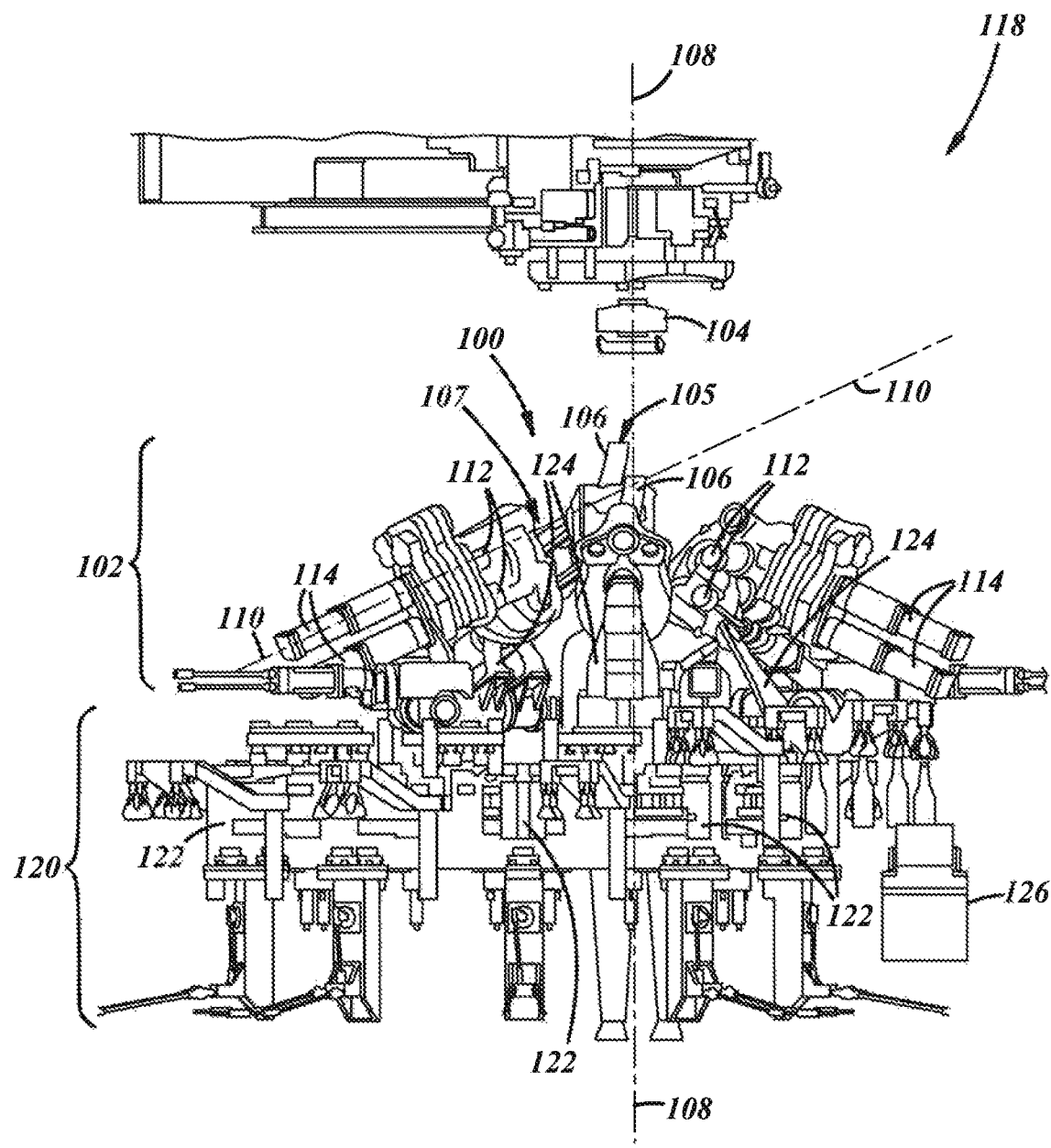
FIG. 1 is a side view illustrating an angled glass blank feeding apparatus and system for distributing a glass gob into an angled blank mold directly from an exit end of a scoop, in accordance with an illustrative embodiment of the present disclosure.

In accordance with at least one aspect of the disclosure, an apparatus, system, and method is provided for feeding a glass gob into an angled blank mold directly from an exit end of a scoop. The apparatus, system, and method do not require a large height difference between the glass feeder and the corresponding blank mold as in other systems because a conventional trough and deflector are removed and the blank mold is placed on an angle to receive the gob directly from the exit end of the scoop.

Silica-based glass (soda-lime-silica glass) as well as other types of glass are prevalent in the manufacture of glass containers and other articles. Molten glass used to make such articles can be conventionally prepared by reacting and melting a batch of glass-forming materials in a refractory lined, continuously operated glass furnace, tank, and/or pot. The batch of glass-forming materials is typically introduced into the furnace by being deposited into a pool of molten glass already in the furnace. The batch is gradually melted into the pool by continuous application of heat. After the batch has been melted, refined, and homogenized within the furnace, the resulting molten glass is typically directed to one or more forehearths where it is thermally conditioned by being cooled to a suitable temperature for forming. A feeder located at a downstream end of the one or more forehearths can be used to measure out and form predetermined amounts of molten glass known as "gobs," which can be delivered to a blank mold using gravity using, for example, a delivery system including troughs and/or deflectors. The gobs may then be formed into parisons and, subsequently, individual glass articles using a glass forming machine. Conventional equipment generally requires gravity to feed a glass gob to a forming machine, thus requiring large amounts of vertical space. Additionally, the delivery system within conventional equipment can require large amounts of horizontal space. This vertical and horizontal space can be valuable.

Consequently, the present disclosure is directed to an apparatus, system, and method that feeds a glass gob into an angled blank mold directly from an exit end of a scoop instead of using a trough and deflector to guide the glass gob. By placing the blank mold at an angle and feeding the glass gob into a blank mold directly from the scoop, the need for a conventional trough and deflector is eliminated and the height difference between the glass feeder and the blank mold that exists in conventional systems is minimized.

FIGS. 1 through 5 illustrate a glass blank feeding apparatus 100 and system 118 in accordance with an illustrative embodiment of the present disclosure. The glass blank feeding apparatus 100 can comprise at least one scoop 106 and at least one a blank mold 112, which may be carried by an upper table 102 and further include a plunger mechanism 114. The scoop 106 can be configured to receive a glass gob 116 and provide the glass gob 116 to the blank mold 112 using the scoop 106 along a longitudinal axis 110 extending at a non-zero angle from a vertical axis 108, where the vertical axis 108 can be aligned with a gob feed trajectory of the gob feeder 104. The system 118 can comprise a gob feeder 104, the glass blank feeding apparatus 100, and a lower rotary table 120 that carries at least one blow mold 122.

The gob feeder 104 can be configured to form and provide at least one glass gob 116 to at least one scoop 106. The gob feeder 104 can be pivotably mounted within the glass blank feeding apparatus 100 and can include a housing and/or an outlet from which molten glass is released. In the embodiment illustrated in FIG. 1, the gob feeder 104 can be configured to provide the glass gob(s) 116 to one or more scoops 106, where the scoops 106 may be in different locations. The gob feeder 104 may also be configured to provide multiple glass gobs simultaneously to different scoops 106.

In some embodiments, a shear mechanism (not shown) can be operatively connected to the gob feeder 104 proximate to the outlet and can shear the molten glass as it exits from the outlet of the gob feeder 104. Shearing the molten glass as it exits the outlet of the gob feeder 104 creates a glass gob 116. In an example, the shear mechanism can include shears configured to separate and shear the glass gob 116 from the molten glass supply and the gob feeder 104.

The glass gob(s) 116 can fall from the gob feeder 104 to a receiving end 105 of the at least one scoop 106. Each scoop 106 can be configured to receive the glass gob 116 from the gob feeder 104 and direct the glass gob 116 from an exit end 107 of the scoop 106 to a blank mold 112. In implementations, the scoop 106 can include an at least partially curved channel and/or conduit. The receiving end 105 of the scoop 106 can be aligned along a vertical axis 108, and the scoop 106 can be curved so that the exit end 107 of the scoop 106 is aligned along a longitudinal axis 110. The longitudinal axis 110 can be aligned at a non-zero angle θ from the vertical axis 108. In some examples, the non-zero angle can be 95°-165°, including all ranges, sub-ranges, endpoints, and values thereof/therebetween. It will be appreciated that the non-zero angle may include other angles suitable for directing the glass gob 116 from the gob feeder 104.

In some instances, the scoop(s) 106 may be height-adjustable. For example, adjusting means (e.g., a motor coupled to the scoop(s) 106) can be used to adjust (e.g., vertically, pivotably, and the like) the scoop(s) 106.

Figure 2:
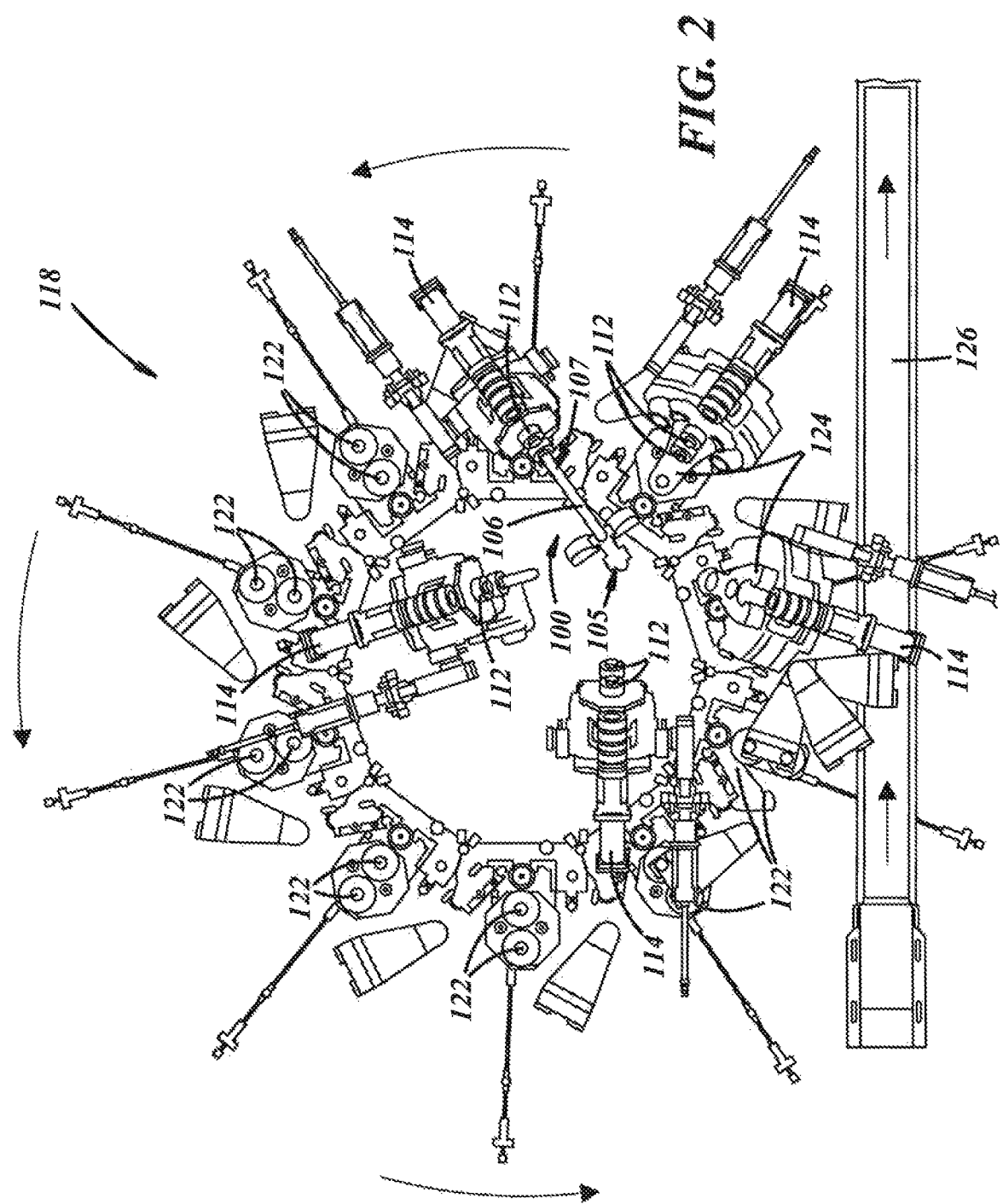
FIG. 2 is a top plan view illustrating the angled glass blank feeding apparatus and the system for distributing a glass gob into a blank mold directly from an exit end of a scoop illustrated in FIG. 1, in accordance with an illustrative embodiment of the present disclosure.
Figure 3:
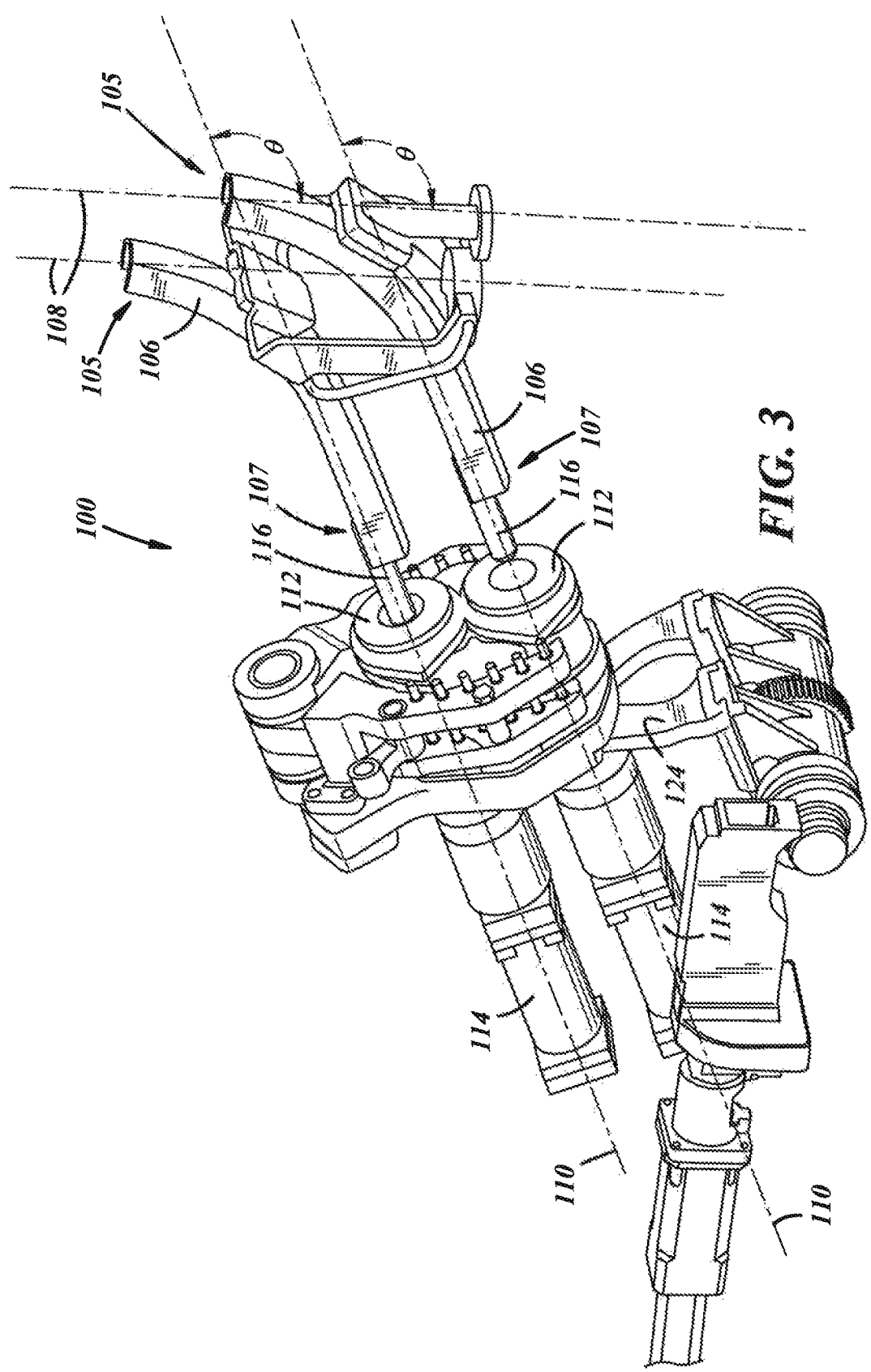
FIG. 3 is an isometric view illustrating the angled glass blank feeding apparatus including multiple scoops and angled blank molds shown in FIGS. 1 and 2, in accordance with an illustrative embodiment of the present disclosure.

As illustrated in FIGS. 1 and 2, the glass blank feeding apparatus 100 can include and/or at least partially be carried by an upper table 102. The upper table 102 can be configured to rotate independently from the gob feeder 104 and/or the scoop(s) 106 and can include a rotary table configured to carry and include other components of the glass blank feeding apparatus 100 that involve forming a parison.

For example, the upper table 102 can carry at least one blank mold 112, which can be configured to receive at least one glass gob 116 directly from the exit end 107 of the scoop(s) 106 and create a parison. As shown in FIGS. 1 through 4, the length of the blank mold 112 can be aligned along the longitudinal axis 110 so that each glass gob 116 can be received directly from the scoop 106 into the baffle end of the blank mold 112. By receiving the glass gob 116 into the blank mold 112 directly from angled scoop 106, the overall height of the glass blank feeding apparatus 100 can be minimized and other conventional components (e.g., a trough, a deflector) may be eliminated. It will be appreciated that the upper table 102 can carry a variety of configurations and numbers of blank molds 112.

Additionally, the upper table 102 may include a plunger mechanism 114 and/or a baffle (not shown). The plunger mechanism 114 can include a plunger configured to at least partially form a parison from each glass gob 116 using various techniques, such as blow-and-blow or press-and-blow processes. The plunger mechanism 114 can be aligned along the longitudinal axis 110 and with the blank mold 112. The baffle can include a closing body configured to close the blank mold 112 during parison forming.

Illustrated in FIGS. 1 and 2, a system 118 can comprise the gob feeder 104, the angled glass blank feeding apparatus 100, and a lower table 120. The lower table 120 can be disposed proximate to (e.g., below) the upper table 102 and can rotate independently from the upper table 102 while being synced to receive a parison from each blank mold 112. The lower table 120 can comprise a blow mold 122, which can include a device configured to form the parison into a final shape of a glass container. For example, the parison can be moved from the upper table 102 and/or the blank mold 112 using, for example, a neckring arm 124, and can be clamped into the blow mold 122, after which air can be blown into the parison. The air pushes the parison out to match the mold shape for forming each glass container. The upper table 102 and the lower table 120 may rotate at different rates and may be synced for transferring each parison from a respective blank mold 112 to a respective blow mold 122.

In some embodiments, the system 118 can include a conveyor 126 configured for receiving a glass container from the blow mold and for moving each glass container to a downstream location. Some examples of a conveyor 126 can include a belt conveyor and/or a chain conveyor.

As shown in FIG. 5, the system 118 may include at least one sensor 128. The sensor 128 can be configured to be used for proper loading of each glass gob 116 from the scoop 106 to the blank mold 112 and/or from the blank mold 112 to the lower table 120 and blow mold 122. The sensor 128 can detect the location of each glass gob 116 and can communicate to a controller that operates system 118 so that proper syncing of the gob feeder 104, the upper table 102, and the lower table 120 may occur. In an example, the sensor 128 may comprise one or more multiple cameras for detecting the position of each glass gob 116. Some examples of a camera may include an optical camera, an infrared camera, and/or other devices capable of detecting a glass gob. It is contemplated that the sensor 128 may include other sensors suitable for detecting location of a glass gob.

The system 118 generally may include the controller 130 having memory, a processor coupled to the memory, one or more interfaces coupled to the processor, one or more input devices coupled to the processor, and/or one or more output devices coupled to the processor.

The various input devices and output devices may be separate or integrated, and may be used to receive or transmit any suitable user input or output, whether tactile, audible, and/or visual. The input devices may include peripheral input devices or user input devices, for example, a pointing device (e.g., a mouse), keyboard, microphone, camera, and/or the like.

The processor may process data and execute instructions that provide at least some of the functionality for the system 118. As used herein, the term instructions may include, for example, control logic, computer software and/or firmware, programmable instructions, or other suitable instructions. The processor may include, for example, one or more microprocessors, microcontrollers, application specific integrated circuits, and/or any other suitable type of electronic processing device(s).

The memory may include any computer readable medium or media configured to provide at least temporary storage of at least some data, an operating system, application programs, program modules or data, and/or other computer software or computer-readable instructions that provide at least some of the functionality of the system and that may be executed by the processor. The memory may be in the form of removable and/or non-removable, volatile memory and/or non-volatile memory. Illustrative volatile memory may include, for example, random access memory (RAM), for running software and data on the processor. By way of example, the volatile memory may include an operating system, application programs, other memory modules, and data. Illustrative non-volatile memory may include, for example, read only memory (ROM).

FIG. 6 illustrates an example of a method 400 for feeding glass gobs 116 from a gob feeder 104 into an angled blank mold 112. For purposes of illustration and clarity, method 400 will be described in the context of the glass blank feeding apparatus 100 and system 118 described above and illustrated in FIGS. 1 through 5. It will be appreciated, however, that the application of the present methodology is not meant to be limited solely to such an arrangement, but rather method 400 may find application with any number of arrangements (i.e., steps of method 400 may be performed by components of the glass blank feeding apparatus 100 and system 118 other than those described below, or arrangements of the glass blank feeding apparatus 100 and system 118 other than that described above).

Method 400 comprises a step 402 of dispensing the glass gob 116 along a vertical axis 108 from a gob feeder 104 to a scoop 106. The glass gob 116 can be dispensed by the gob feeder 104 and can fall along the vertical axis 108 to the scoop 106, which can in turn direct the glass gob 116 along a longitudinal axis 110 to the blank mold 112. As previously described, the longitudinal axis 110 can be aligned at a non-zero angle θ from the vertical axis 108. In a specific example, the glass gob 116 can be dispensed from the gob feeder 104 along the vertical axis 108 and directed by the scoop 106 along a longitudinal axis 110 that is at a 135° angle from the vertical axis 108. Additionally, dispensing the glass gob 116 may be a continuous flow operation instead of an indexed operation. Dispensing the glass gob 116 may be controlled by an actuator and/or a controller 130 included within and/or coupled to system 118.

Next, method 400 comprises a step 404 of forming the glass gob 116 into a parison using the angled blank mold 112. In this step, the blank mold 112 can receive the glass gob 116 directly from the exit end 107 of the scoop 106 and along the longitudinal axis 110. The blank mold 112 can form the parison using, for example, a press-and-blow process where a plunger mechanism 114 disposed proximate to the blank mold 112 can use a metal plunger to press the glass gob 116 out to conform with the blank mold 112 and form a parison. It will be appreciated that other processes may be used to form the glass gob 116 into a parison, for example, a blow-and-blow process. The blank mold 112 and/or the plunger mechanism 114 may be controlled with an actuator and/or a controller 130.

Then, method 400 may comprise a step 406 of rotating the parison to a blow mold 122. For example, rotating the parison can include opening the blank mold 112 and using a neckring arm 124 to move the parison from the opened blank mold 112 to a blow mold 122 carried by the lower table 120. The parison then can be blown out with air in the blow mold 122 to form a glass container. It is contemplated that method 400 may include other steps for rotating the parison to a blow mold 122 and/or for forming a glass container.

Method 400 or parts thereof can be implemented in a computer program product including instructions carried on a computer readable medium for use by one or more processors of one or more computers to implement one or more of the method steps. The computer program product can be executed on one computer or on multiple computers in communication with one another. It is therefore to be understood that the method may be at least partially performed by any electronic articles and/or devices capable of executing instructions corresponding to one or more steps of the disclosed method.

There thus has been disclosed a glass blank feeding apparatus, system, and method for feeding a glass gob to an angled blank mold that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A system, comprising:
  a gob feeder;
  an angled glass blank feeding apparatus including at least one scoop configured to receive along a vertical axis from the gob feeder;
  at least one blank mold aligned along a longitudinal axis at a non-zero angle from the vertical axis, where the at least one blank mold is configured to receive the glass gob directly from the at least one scoop along the longitudinal axis and is carried by an upper rotary table, and where a lower rotary table including at least one blow mold configured to form the glass gob into a parison; and
  a lower rotary table including at least one blow mold configured to receive the parison from the blank mold.

2. The system in claim 1, further comprising: a controller coupled to at least one of the gob feeder, the upper rotary table, or the lower rotary table.

3. An angled glass blank feeding apparatus, comprising:
  at least one scoop configured to receive a glass gob along a vertical axis from a gob feeder; and
  a blank mold aligned along a longitudinal axis at a non-zero angle from the vertical axis, the blank mold is configured to receive the glass gob directly from the at least one scoop along the longitudinal axis and the blank mold is further configured to form the glass gob into a parison, wherein the blank mold includes circumferentially complete side walls aligned along the longitudinal axis, the side walls extending from a baffle end of the blank mold.

4. A system, comprising:
a gob feeder;
an angled glass blank feeding apparatus including at least one scoop configured to receive a glass gob along a vertical axis from the gob feeder; and
at least one blank mold aligned along a longitudinal axis at a non-zero angle from the vertical axis, where the at least one blank mold is configured to receive the glass gob directly from the at least one scoop along the longitudinal axis and is carried by an upper rotary table, and where the blank mold is configured to form the glass gob into a parison, wherein the upper rotary table includes a baffle.

5. The system of claim 4 wherein the baffle includes a closing body configured to close the blank mold during parison forming.

* * * * *